(12) United States Patent
Nakayashiki et al.

(10) Patent No.: US 12,068,619 B2
(45) Date of Patent: Aug. 20, 2024

(54) CONTACTLESS POWER SUPPLY SYSTEM

(71) Applicant: DENSO CORPORATION, Kariya (JP)

(72) Inventors: Yuusei Nakayashiki, Kariya (JP); Masaya Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 43 days.

(21) Appl. No.: 17/837,583

(22) Filed: Jun. 10, 2022

(65) Prior Publication Data

US 2022/0302766 A1    Sep. 22, 2022

Related U.S. Application Data

(63) Continuation of application No. PCT/JP2020/044215, filed on Nov. 27, 2020.

(30) Foreign Application Priority Data

Dec. 12, 2019    (JP) ................. 2019-224374

(51) Int. Cl.
*H02J 50/50*    (2016.01)
*H02J 50/05*    (2016.01)
*H02J 50/12*    (2016.01)
*H02J 50/40*    (2016.01)

(52) U.S. Cl.
CPC .............. *H02J 50/50* (2016.02); *H02J 50/05* (2016.02); *H02J 50/12* (2016.02); *H02J 50/40* (2016.02)

(58) Field of Classification Search
CPC .. H02J 50/50; H02J 50/05; H02J 50/12; H02J 50/40
See application file for complete search history.

(56) References Cited

U.S. PATENT DOCUMENTS

| | | | |
|---|---|---|---|
| 2010/0225271 A1 | 9/2010 | Oyobe et al. | |
| 2012/0161696 A1* | 6/2012 | Cook | B60L 3/04 320/108 |
| 2012/0318586 A1 | 12/2012 | Atarashi | |
| 2013/0015699 A1* | 1/2013 | Mita | H02J 50/12 307/104 |
| 2013/0026850 A1* | 1/2013 | Throngnumchai | H02J 50/12 307/104 |
| 2013/0099583 A1 | 4/2013 | Lee | |
| 2013/0249306 A1 | 9/2013 | Kim et al. | |
| 2013/0257370 A1 | 10/2013 | Ichikawa | |
| 2014/0021794 A1 | 1/2014 | Kim et al. | |

* cited by examiner

*Primary Examiner* — Carlos Amaya
(74) *Attorney, Agent, or Firm* — Oliff PLC

(57) ABSTRACT

A contactless power supply system includes: a power transmitter including a first capacitor and a power transmission coil, and having a first resonant frequency; a power receiver including a second capacitor and a power reception coil, and having a second resonant frequency; and a repeater that transmits, to the power reception coil, AC power received from the power transmission coil. The repeater may include: a relay power reception coil unit that receives AC power and includes at least one coil that defines a first stray capacitance for forming a first self-resonant frequency having a frequency identical to the first resonant frequency; and a relay power transmission coil unit that transmits AC power and includes at least one coil that defines a second stray capacitance for forming a second self-resonant frequency having a frequency identical to the second resonant frequency.

14 Claims, 10 Drawing Sheets

CONTACTLESS POWER SUPPLY SYSTEM

CROSS-REFERENCE TO RELATED APPLICATION

The present application is a continuation application of International Application No. PCT/JP2020/044215, filed on Nov. 27, 2020, which claims priority to Japanese Patent Application No. 2019-224374, filed on Dec. 12, 2019. The contents of these applications are incorporated herein by reference in their entirety.

BACKGROUND

Technical Field

The present disclosure relates to a contactless power supply system.

Background Art

Electric vehicles are known that have a power reception coil thereof supplied with power from a power transmission coil disposed on a road surface in a contactless manner. A known technique in such electric vehicles is providing, at a position between a power transmission coil and a power reception coil in a vehicle, a repeater including a resonant circuit having a coil and a capacitor, to increase the power transmission efficiency.

SUMMARY

In the present disclosure, provided is a contactless power supply system as the following. The contactless power supply system for vehicles includes: a power transmitter including a first capacitor and a power transmission coil and having a first resonant frequency; a power receiver including a second capacitor and a power reception coil and having a second resonant frequency; and a repeater that transmits, to the power reception coil, AC power received from the power transmission coil. The repeater may include: a relay power reception coil unit configured to receive AC power transmitted from the power transmission coil and including at least one coil that defines a first stray capacitance for forming a first self-resonant frequency having a frequency identical to the first resonant frequency; and a relay power transmission coil unit configured to transmit AC power to the power receiver and including at least one coil that defines a second stray capacitance for forming a second self-resonant frequency having a frequency identical to the second resonant frequency.

BRIEF DESCRIPTION OF THE DRAWINGS

The object described above and other objects, features, and advantages of the present disclosure are further clarified by the following detailed description with reference to accompanying drawings. The drawings include as follows.

DETAILED DESCRIPTION OF THE PREFERRED EMBODIMENTS

For example, PCT International Publication No. WO 2011/108403 discloses such a repeater, there is a requirement of decreasing the overall size of the device to improve the freedom of disposition of the repeater in a vehicle or on a road surface.

The present disclosure can be realized as following aspects.

According to one aspect of the present disclosure, there is provided a contactless power supply system for vehicles. The contactless power supply system includes: a power transmitter including a first capacitor and a power transmission coil that transmits AC power, and having a first resonant frequency defined by the power transmission coil and the first capacitor; a power receiver including a second capacitor and a power reception coil that receives AC power, and having a second resonant frequency defined by the power reception coil and the second capacitor; and a repeater that transmits, to the power reception coil, AC power received from the power transmission coil. The repeater may include: a relay power reception coil unit configured to receive AC power transmitted from the power transmission coil and including at least one coil that defines a first stray capacitance for forming a first self-resonant frequency having a frequency identical to the first resonant frequency; and a relay power transmission coil unit configured to transmit AC power to the power receiver and including at least one coil that defines a second stray capacitance for forming a second self-resonant frequency having a frequency identical to the second resonant frequency.

The contactless power supply system according to this aspect includes a repeater that transmits, to a power reception coil, AC power received from a power transmission coil. A relay power reception coil unit of the repeater allows at least one coil to define a first stray capacitance for forming a first self-resonant frequency having a frequency identical to a first resonant frequency. A relay power transmission coil unit allows at least one coil to define a second stray capacitance for forming a second self-resonant frequency having a frequency identical to a second resonant frequency. Thus, the repeater can receive AC power from the power transmitter and transmit the AC power to the power receiver, without including a capacitor. Accordingly, it is possible to decrease the size of the repeater and improve the freedom of disposition of the repeater.

A. First Embodiment

Figure 1:
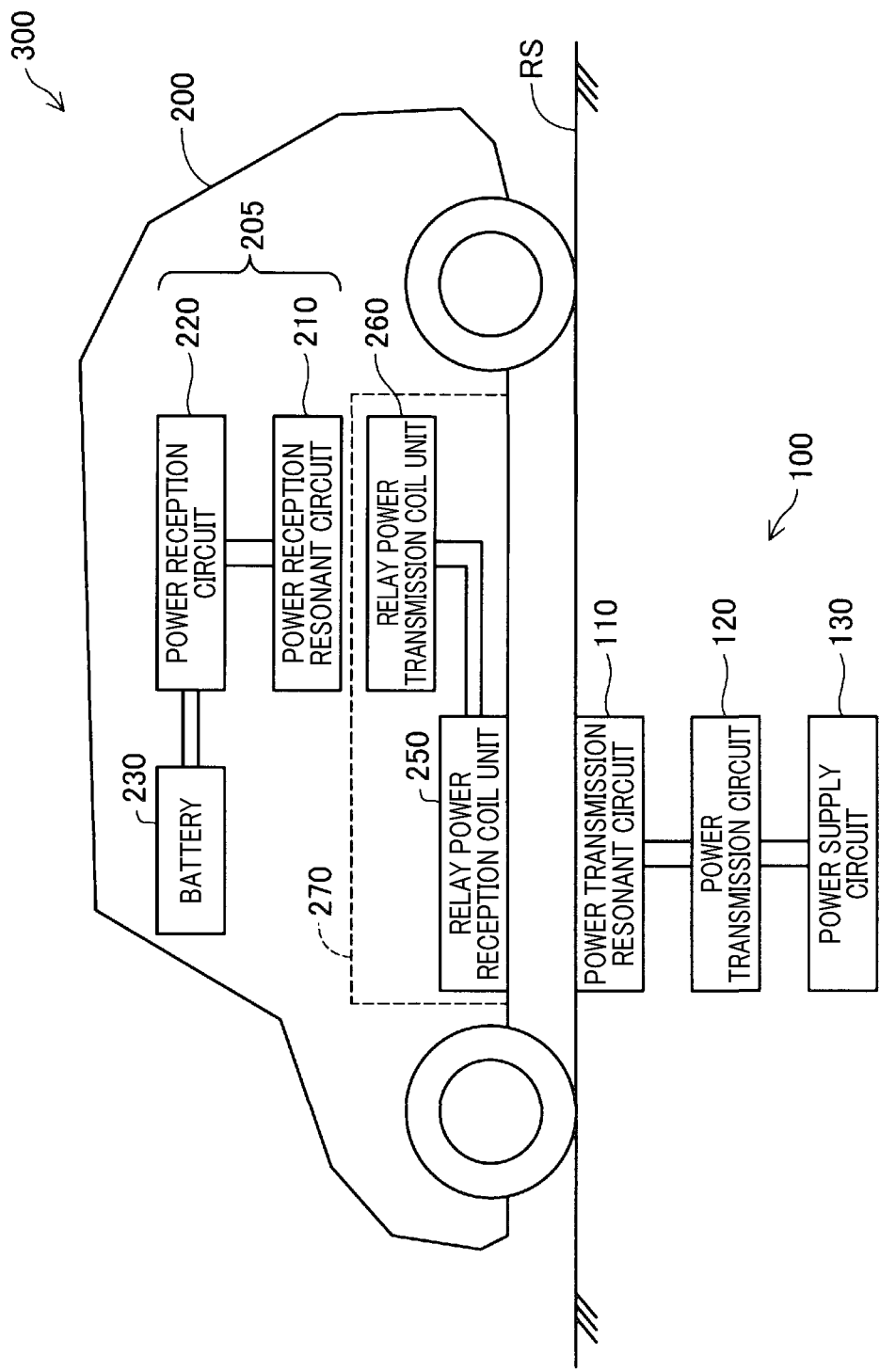
FIG. 1 is a diagram illustrating a configuration of a contactless power supply system.

A configuration of a contactless power supply system 300 according to the present embodiment is described with reference to FIGS. 1 and 2. As illustrated in FIG. 1, the contactless power supply system 300 according to the present embodiment is a system enables supply of power from a power transmitter 100 to a vehicle 200 in a contactless manner. The contactless power supply system 300 includes the power transmitter 100 installed on a road RS, a power receiver 205 mounted in the vehicle 200, and a repeater 270 that receives AC power from the power transmitter and transmits the AC power to the power receiver 205.

The power transmitter 100 includes a power transmission resonant circuit 110, a power transmission circuit 120, and a power supply circuit 130. The power transmission resonant circuit 110, the power transmission circuit 120, and the power supply circuit 130 are embedded in the road RS. The power transmitter 100 may include a plurality of power transmission resonant circuits 110 and a plurality of power transmission circuits 120, which may be continuously provided along an extending direction of the road RS that is to be a travel direction of the vehicle 200. The power transmission circuit 120 and the power supply circuit 130 does not necessarily have to be embedded in the road RS, and may be provided, for example, at a position on the road RS that does not block travelling of the vehicle 200. The power transmission circuit 120 and the power supply circuit 130 are preferably provided in the vicinity of the power transmission resonant circuit 110.

The power supply circuit 130 supplies DC power to the power transmission circuit 120. The power transmission circuit 120 is an AC conversion circuit including an inverter circuit and a filter circuit. The power transmission circuit 120 converts the DC power supplied from the power supply circuit 130 to high-frequency AC power and supplies it to the power transmission resonant circuit 110.

The power transmission resonant circuit 110 transmits, to a relay power reception coil unit 250 of the repeater 270, AC power induced in a power transmission coil 112 using an electromagnetic induction phenomenon. As illustrated in FIG. 2, the power transmission resonant circuit 110 includes the power transmission coil 112 and a first capacitor 116 that functions as a resonant capacitor. A resonant frequency defined by the electric capacitance of the first capacitor 116 and the self-inductance of the power transmission coil 112 is hereinafter also called a first resonant frequency.

The vehicle 200 consists of, for example, a vehicle having a drive motor mounted therein, such as an electric vehicle or a hybrid vehicle. As illustrated in FIG. 1, the vehicle 200 includes the repeater 270, the power receiver 205, and a battery 230. The power receiver 205 includes a power reception resonant circuit 210 and a power reception circuit 220.

Figure 2:
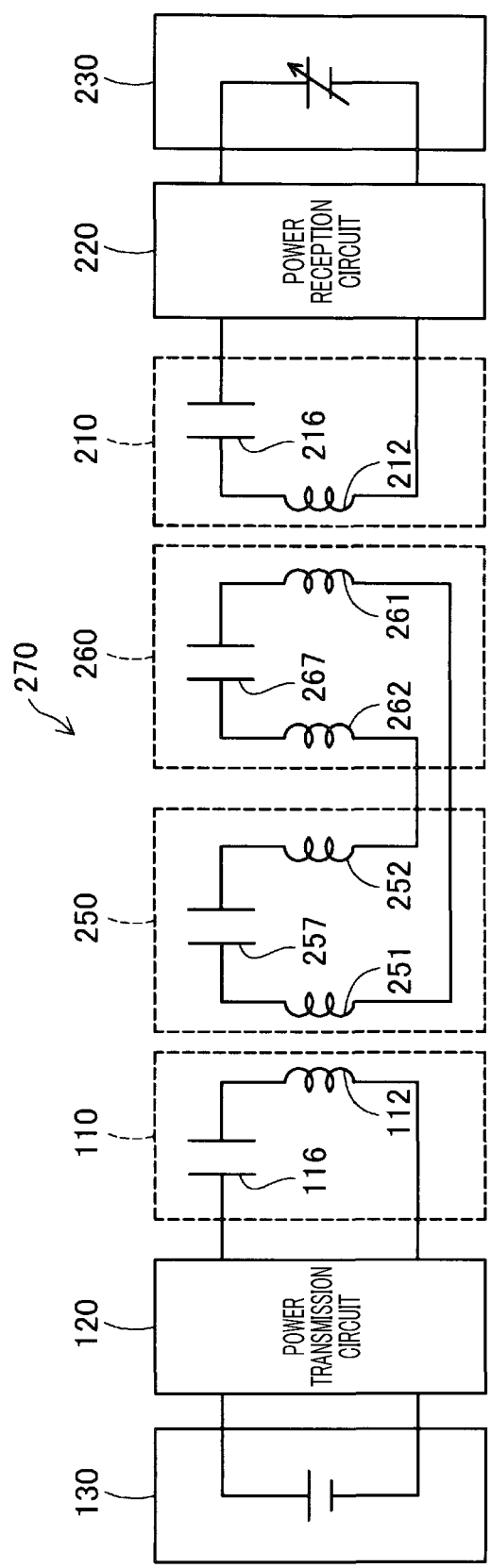
FIG. 2 is a diagram illustrating a circuit configuration of the contactless power supply system.

As illustrated in FIG. 2, the power reception resonant circuit 210 includes a power reception coil 212 and a second capacitor 216 that functions as a resonant capacitor. The power reception resonant circuit 210 receives, through the power reception coil 212, AC power induced in a relay power transmission coil unit 260 of the repeater 270. A resonant frequency defined by the electric capacitance of the second capacitor 216 and the self-inductance of the power reception coil 212 is hereinafter also called a second resonant frequency.

The power reception circuit 220 converts, to DC power, AC power output from the power reception resonant circuit 210. The power reception circuit 220 includes, for example, a filter circuit, a rectifier circuit that converts AC power to DC power, and a power conversion circuit that converts the DC power to DC power suitable for charging the battery 230 as a load. The battery 230 is a secondary battery that outputs DC power for driving the drive motor serving as a drive source of the vehicle 200. The DC power output from the power reception circuit 220 can be used for charging the battery 230. The DC power from the power reception circuit 220 may be used for charging an auxiliary battery, or driving the drive motor or an auxiliary machine (all not illustrated).

The repeater 270 transmits, to the power reception resonant circuit 210, AC power received from the power transmission resonant circuit 110. As illustrated in FIG. 1, the repeater 270 includes the relay power reception coil unit 250 that receives AC power transmitted from the power transmission coil 112, and the relay power transmission coil unit 260 that transmits AC power to the power receiver 205.

Figure 3:
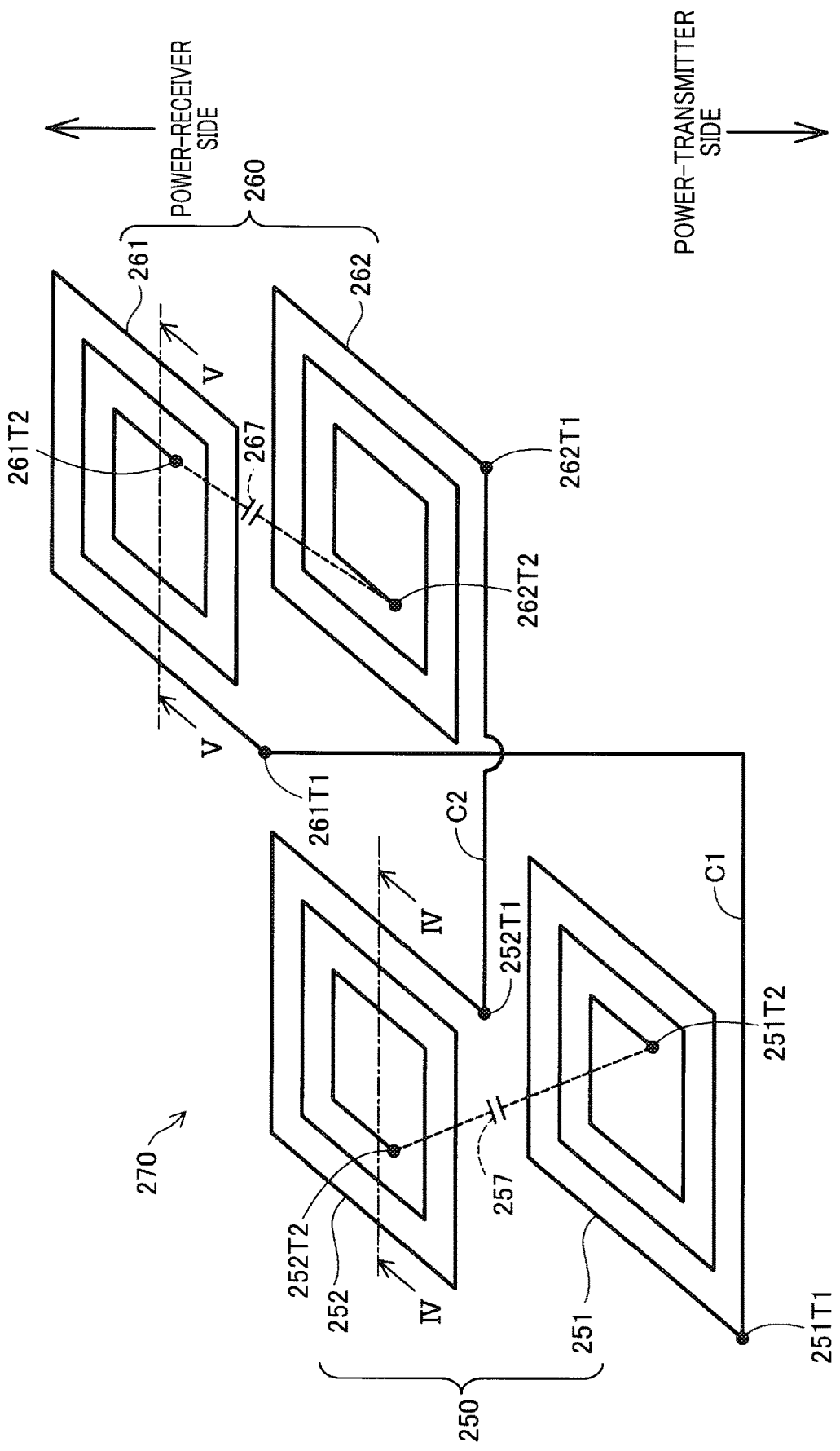
FIG. 3 is a diagram illustrating a configuration of coils included in a repeater.

As illustrated in FIG. 3, the relay power reception coil unit 250 in the present embodiment includes two coils, i.e., a first relay power reception coil 251 and a second relay power reception coil 252. The relay power transmission coil unit 260 includes two coils, i.e., a first relay power transmission coil 261 and a second relay power transmission coil 262. The first and second relay power reception coils 251 and 252 and the first and second relay power transmission coils 261 and 262 have a substantially tabular shape and are formed by winding a plurality of times a copper wiring line having a substantially rectangular sectional shape. The first and second relay power reception coils 251 and 252 and the first and second relay power transmission coils 261 and 262 can be obtained, for example, by cutting a copper plate into a coil and enclosing the coil in a resin mold.

In the present embodiment, as illustrated in FIG. 3, the repeater 270 includes so-called open coils. More specifically, a first end 251T1 of the first relay power reception coil 251 is electrically connected to a first end 261T1 of the first relay power transmission coil 261 via a wiring line C1. A second end 251T2 of the first relay power reception coil 251 and a second end 261T2 of the first relay power transmission coil 261 are open. The first end 252T1 of the second relay power reception coil 252 is electrically connected to the first end 262T1 of the second relay power transmission coil 262 via a wiring line C2. The second end 252T2 of the second relay power reception coil 252 and the second end 262T2 of the second relay power transmission coil 262 are open.

As illustrated in FIG. 3, the first relay power reception coil 251 is a right-handed coil extending toward the center of the coil from the first end 251T1 that is disposed on the outer periphery side of the coil and electrically connected to the first relay power transmission coil 261. The second relay power reception coil 252 is a left-handed coil extending toward the center of the coil from the first end 252T1 that is disposed on the outer periphery side of the coil and electrically connected to the second relay power transmission coil 262. The second relay power reception coil 252 may be a right-handed coil extending from the first end 252T1 toward the center of the coil. The first and second relay power reception coils 251 and 252 may be opposite in configuration. More specifically, the first relay power reception coil 251 may be a left-handed coil extending toward the center of the coil from the first end 251T1 that is disposed on the outer periphery side of the coil and electrically connected to the first relay power transmission coil 261, and the second relay power reception coil 252 may be a right-handed coil extending toward the center of the coil from the first end 252T1 that is disposed on the outer periphery side of the coil and electrically connected to the second relay power transmission coil 262. The combination of these coil configurations in the relay power reception coil unit 250 consisting of the first and second relay power reception coils 251 and 252 is also called a "first combination".

The first and second relay power reception coils 251 and 252 are disposed in a lower part of the vehicle 200, with their surfaces opposite to each other in parallel and their axial centers coinciding with each other. The first relay power reception coil 251 is disposed lower in the vehicle 200 than the second relay power reception coil 252, that is, disposed on the power-transmitter 100 side. The first and second relay power reception coils 251 and 252 function as resonant coils for magnetic resonance with the power transmission coil 112.

Figure 4:
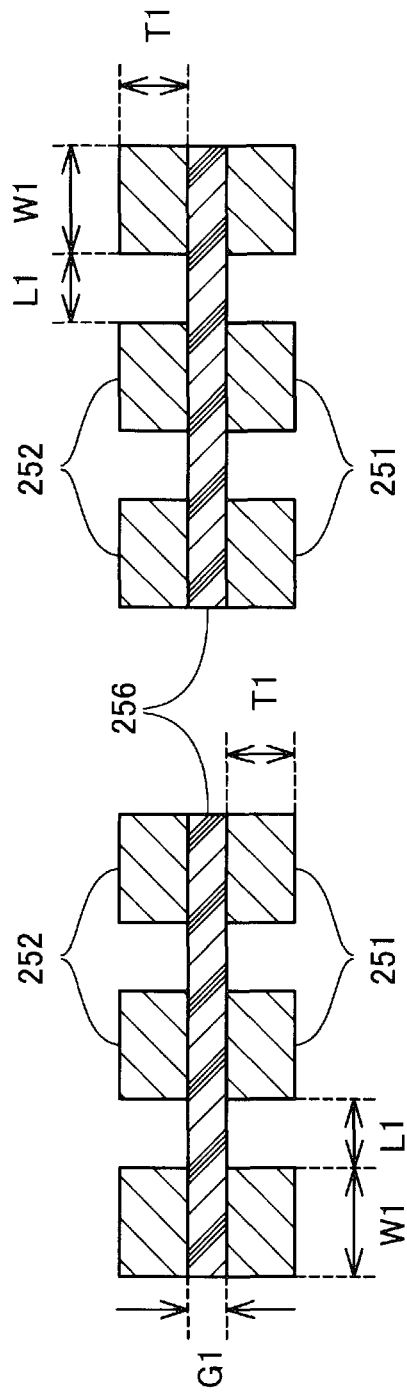
FIG. 4 is a sectional view taken along a line IV-IV in FIG. 3.

As illustrated in FIG. 4, the first relay power reception coil 251 has a width W1 which is larger than a thickness T1 in the vertical section of the conductor wiring line constituting the coil. A distance L1 between portions of the conductor wiring line of the first relay power reception coil 251 is larger than a distance G1 between the first and second relay power reception coils 251 and 252. The distance G1 between the first and second relay power reception coils 251 and 252 means the shortest distance between the first and second relay power reception coils 251 and 252. The second relay power reception coil 252 is configured similarly to the first relay power reception coil 251.

The first and second relay power reception coils 251 and 252 are fixed close to each other so as to generate a stray capacitance connected in series. In other words, the distance G1 between the first and second relay power reception coils 251 and 252 is adjusted small so as to generate a stray capacitance in series. Stray capacitances generated in the first and second relay power reception coils 251 and 252 include, in addition to the stray capacitance connected in series between the first and second relay power reception coils 251 and 252, for example, a stray capacitance connected in parallel between portions of the conductor wiring line of each of the coils. In the present embodiment, the stray capacitance in series is configured to be significantly larger than the stray capacitance in parallel, and therefore it is regarded as generating only the stray capacitance in series. The combined capacitance of stray capacitances in series generated between the first and second relay power reception coils 251 and 252 is hereinafter also called a first stray capacitance 257.

In the present embodiment, as illustrated in FIG. 4, a dielectric material 256 is disposed between the first and second relay power reception coils 251 and 252. The dielectric material 256 is, for example, a ferroelectric such as barium titanate. The dielectric material 256 may be a paraelectric such as aluminum oxide or forsterite and may be any dielectric material having a relative permittivity of 1 or more, if it is not a ferroelectric.

The relay power reception coil unit 250 has a first self-resonant frequency defined by the first relay power reception coil 251, the second relay power reception coil 252, and the first stray capacitance 257. The first self-resonant frequency is set to be identical to the first resonant frequency of the power transmission resonant circuit 110 of the power transmitter 100. The first self-resonant frequency includes a series resonant frequency which is smaller than a parallel resonant frequency thereof. The first and second relay power reception coils 251 and 252 are magnetically coupled with the power transmission coil 112 and thus receive AC power from the power transmitter 100.

As illustrated in FIG. 3, the relay power transmission coil unit 260 includes the first relay power transmission coil 261 and the second relay power transmission coil 262. As illustrated in FIG. 3, the first relay power transmission coil 261 is a right-handed coil extending toward the center of the coil from the first end 261T1 that is disposed on the outer periphery side of the coil and electrically connected to the first relay power transmission coil 261. The second relay power transmission coil 262 is a left-handed coil extending toward the center of the coil from the first end 262T1 that is disposed on the outer periphery side of the coil and electrically connected to the second relay power reception coil 252. The second relay power transmission coil 262 may be a right-handed coil extending from the first end 262T1 toward the center of the coil. The first and second relay power transmission coils 261 and 262 may be opposite in configuration. More specifically, the first relay power transmission coil 261 may be a left-handed coil extending toward the center of the coil from the first end 261T1 that is disposed on the outer periphery side of the coil and electrically connected to the first relay power reception coil 251, and the second relay power transmission coil 262 may be a right-handed coil extending toward the center of the coil from the first end 262T1 that is disposed on the outer periphery side of the coil and electrically connected to the second relay power reception coil 252. The combination of these coil configurations in the relay power transmission coil unit 260 consisting of the first and second relay power transmission coils 261 and 262 is also called a "fourth combination".

The first and second relay power transmission coils 261 and 262 are disposed in the vehicle 200, with their surfaces opposite to each other in parallel and their axial centers coinciding with each other. The second relay power transmission coil 262 is positioned closer to the power receiver 205 than the first relay power transmission coil 261 and disposed such that the axial center of the second relay power transmission coil 262 coincides with the axial center of the power reception coil 212. The first and second relay power transmission coils 261 and 262 function as resonant coils for magnetic resonance with the power reception coil 212. The axial centers of the first and second relay power transmission coils 261 and 262 do not necessarily have to coincide with the axial centers of the first and second relay power reception coils 251 and 252.

Figure 5:
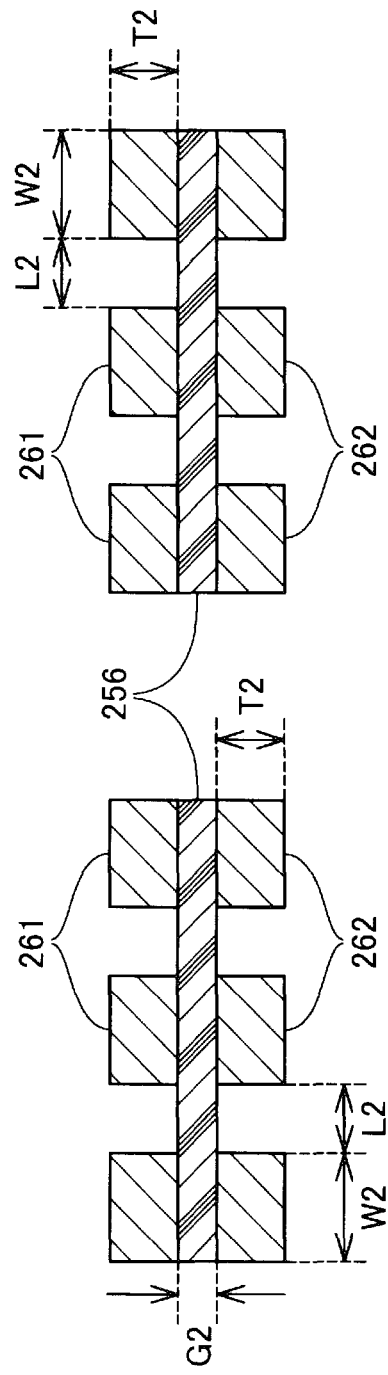
FIG. 5 is a sectional view taken along a line V-V in FIG. 3.

As illustrated in FIG. 5, the first relay power transmission coil 261 has a width W2 which is larger than a thickness T2 in the vertical section of the conductor wiring line constituting the coil. A distance L2 between portions of the conductor wiring line of the first relay power transmission coil 261 is larger than a distance G2 between the first and second relay power transmission coils 261 and 262. The distance G2 between the first and second relay power transmission coils 261 and 262 means the shortest distance between the first and second relay power transmission coils 261 and 262. The second relay power transmission coil 262 is configured similarly to the first relay power transmission coil 261. In the present embodiment, a dielectric material 256 is disposed between the first and second relay power transmission coils 261 and 262.

The first and second relay power transmission coils 261 and 262 are fixed close to each other so as to generate a stray capacitance connected in series. In other words, the distance G2 between the first and second relay power transmission coils 261 and 262 is adjusted small so as to generate a stray capacitance in series. In the present embodiment, the stray capacitance in series is configured to be significantly larger than a stray capacitance in parallel, and therefore it is regarded as generating only the stray capacitance in series. The combined capacitance of stray capacitances in series generated between the first and second relay power transmission coils 261 and 262 is hereinafter also called a second stray capacitance 267.

The relay power transmission coil unit 260 has a second self-resonant frequency defined by the first relay power transmission coil 261, the second relay power transmission coil 262, and the second stray capacitance 267. The second self-resonant frequency is set to be identical to the second resonant frequency of the power reception resonant circuit 210 of the power receiver 205. The second self-resonant frequency includes a series resonant frequency which is smaller than a parallel resonant frequency thereof. The first and second relay power transmission coils 261 and 262 are magnetically coupled with the power reception coil 212 and thus transmit AC power to the power receiver 205.

As described above, the contactless power supply system 300 according to the present embodiment includes the repeater 270 that transmits, to the power reception coil 212, AC power received from the power transmission coil 112. The relay power reception coil unit 250 allows the first and second relay power reception coils 251 and 252 to define the first stray capacitance 257 for forming the first self-resonant frequency having a frequency identical to the first resonant frequency. The relay power transmission coil unit 260 allows the first and second relay power transmission coils 261 and 262 to define the second stray capacitance 267 for forming the second self-resonant frequency having a frequency identical to the second resonant frequency. Thus, the repeater 270 can receive AC power from the power transmitter 100 and transmit the AC power to the power receiver 205, without including a capacitor. Accordingly, it is possible to decrease the size of the repeater 270 and improve the freedom of disposition of the repeater 270.

The contactless power supply system 300 according to the present embodiment includes open coils including the first and second relay power reception coils 251 and 252 that generate the first stray capacitance 257 connected in series, and the first and second relay power transmission coils 261 and 262 that generate the second stray capacitance 267 connected in series. The relay power reception and transmission coil units 250 and 260 are electrically connected to each other, enabling them to be disposed at positions with their axial centers not coinciding with each other, for example, disposed separate from each other, and thus enabling an improvement in freedom of the disposition of the repeater 270. The relay power reception and transmission coil units 250 and 260 cause resonance using the stray capacitance in series and therefore facilitate circuit design.

In the contactless power supply system 300 according to the present embodiment, the coils of the relay power reception coil unit 250 are configured by the first combination. More specifically, the first relay power reception coil 251 is a right-handed coil extending from the first end 251T1 that is connected electrically and disposed on the outer periphery side of the coil, and the second relay power reception coil 252 is a left-handed coil extending from the first end 252T1 that is connected electrically and disposed on the outer periphery side of the coil. In each of the coils, the first end connected electrically is disposed on the outer periphery side of the coil, and therefore overlap of the conductor wiring line is not generated in the axis direction of the coil. Accordingly, the process of a copper plate into each of the coils can be facilitated.

In the contactless power supply system 300 according to the present embodiment, the coils of the relay power transmission coil unit 260 are configured by the fourth combination. More specifically, the first relay power transmission coil 261 is a right-handed coil extending from the first end 261T1 that is connected electrically and disposed on the outer periphery side of the coil, and the second relay power transmission coil 262 is a left-handed coil extending from the first end 262T1 that is connected electrically and disposed on the outer periphery side of the coil. In each of the coils, the first end connected electrically is disposed on the outer periphery side of the coil, and therefore overlap of the conductor wiring line is not generated in the axis direction of the coil. Accordingly, the process of a copper plate into each of the coils can be facilitated.

In the contactless power supply system 300 according to the present embodiment, the first relay power reception coil 251 has the width W1 which is larger than the thickness T1 in the vertical section of the conductor wiring line. The conductor wiring line of the first relay power reception coil 251 and the conductor wiring line of the second relay power reception coil 252 have a large area opposite each other, and in each of the first and second relay power reception coils 251 and 252, portions of the conductor wiring line have a small area opposite each other. The distance L1 between portions of the conductor wiring line of the first relay power reception coil 251 is larger than the distance G1 between the first and second relay power reception coils 251 and 252. The distance between the conductor wiring line of the first relay power reception coil 251 and the conductor wiring line of the second relay power reception coil 252 is small, and in each of the first and second relay power reception coils 251 and 252, the distance between portions of the conductor wiring line is large. Accordingly, the first stray capacitance 257 connected in series by the first and second relay power reception coils 251 and 252 can be increased.

In the contactless power supply system 300 according to the present embodiment, the first relay power transmission coil 261 has the width W2 which is larger than the thickness T2 in the vertical section of the conductor wiring line. The conductor wiring line of the first relay power transmission coil 261 and the conductor wiring line of the second relay power transmission coil 262 have a large area opposite each other, and in each of the first and second relay power transmission coils 261 and 262, portions of the conductor wiring line have a small area opposite each other. The distance L2 between portions of the conductor wiring line of the first relay power transmission coil 261 is larger than the distance G2 between the first and second relay power transmission coils 261 and 262. The distance between the first relay power transmission coil 261 and the second relay power transmission coil 262 is small, and in each of the first and second relay power transmission coils 261 and 262, the distance between portions of the conductor wiring line is large. Accordingly, the second stray capacitance 267 connected in series by the first and second relay power transmission coils 261 and 262 can be increased.

In the contactless power supply system 300 according to the present embodiment, the dielectric material 256 is disposed between the first and second relay power reception coils 251 and 252 and between the first and second relay power transmission coils 261 and 262. The dielectric material 256 can increase the first and second stray capacitances 257 and 267. Therefore, for example, the winding number of each of the first and second relay power transmission coils 261 and 262 can be reduced.

B. Second Embodiment

Figure 6:
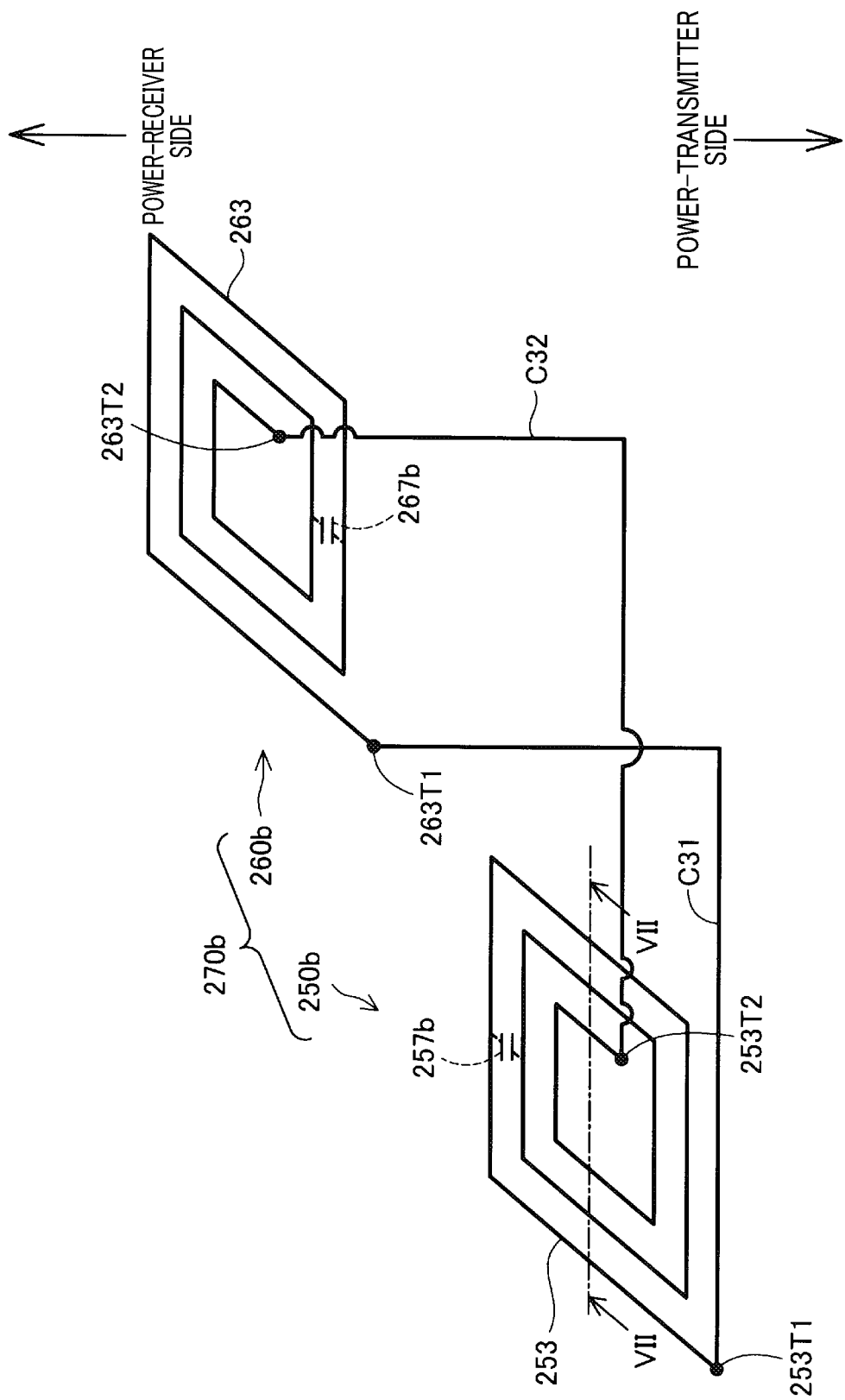
FIG. 6 is a diagram illustrating a configuration of coils in a repeater of a second embodiment.

A contactless power supply system 300 according to a second embodiment includes a repeater 270*b* including short coils. The contactless power supply system 300 according to the second embodiment is different from the contactless power supply system 300 according to the first embodiment in including the repeater 270b instead of the repeater 270, but is similar to the contactless power supply system 300 according to the first embodiment in the other configurations. As illustrated in FIG. 6, the repeater 270b includes a relay power reception coil unit 250b and a relay power transmission coil unit 260b.

The relay power reception coil unit 250b includes a third relay power reception coil 253, and the relay power transmission coil unit 260b includes a third relay power transmission coil 263. In the present embodiment, the third relay power reception and transmission coils 253 and 263 have a substantially tabular shape and are formed by winding a plurality of times a copper wiring line having a substantially rectangular sectional shape. The third relay power reception and transmission coils 253 and 263 can be obtained, for example, by cutting a copper plate into a coil and filling a dielectric material 256 between portions of the conductor wiring line. As the third relay power reception and transmission coils 253 and 263 may be used the tabular coil, and various coils such as a wound spring-shaped coil (also called a spring coil) obtained by helically winding a conductor having a circular, or square or rectangular sectional shape, and a layered coil obtained by stacking a plurality of tabular coils. The dielectric material 256 may be disposed at a position corresponding to between conductor wiring lines of different types of coils.

The third relay power reception coil 253 is disposed in a lower part of the vehicle 200. The third relay power transmission coil 263 is positioned closer to the power receiver 205 than the third relay power transmission coil 263 and disposed such that the axial center of the third relay power reception coil 263 coincides with the axial center of the power reception coil 212. The axial center of the third relay power reception coil 253 does not necessarily have to coincide with the axial center of the third relay power transmission coil 263.

As illustrated in FIG. 6, a first end 253T1 of the third relay power reception coil 253 is electrically connected to a first end 263T1 of the third relay power transmission coil 263 via a wiring line C31. The third relay power reception coil 253 is a right-handed coil extending from the first end 253T1 that is disposed on the outer periphery side of the coil and electrically connected to the third relay power transmission coil 263. A second end 253T2 of the third relay power reception coil 253 is electrically connected to a second end 263T2 of the third relay power transmission coil 263 via a wiring line C32. The third relay power transmission coil 263 is a right-handed coil extending from the first end 263T1 that is disposed on the outer periphery side of the coil and electrically connected to the third relay power reception coil 253.

Figure 7:
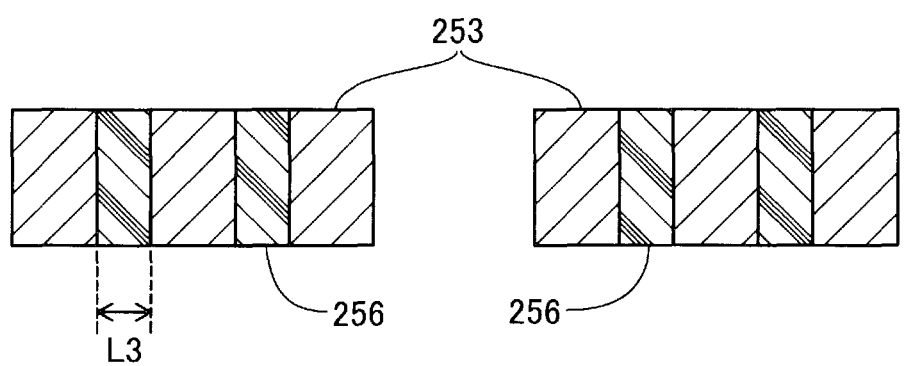
FIG. 7 is a sectional view taken along a line VII-VII in FIG. 6.

As illustrated in FIG. 7, a distance L3 between portions of the conductor wiring line of the third relay power reception coil 253 is adjusted small so as to generate a stray capacitance connected in parallel. In the present embodiment, the dielectric material 256 is disposed between portions of the conductor wiring line of the third relay power reception coil 253. In the present embodiment, the third relay power reception coil 253 is thus configured to have a large stray capacitance connected in parallel between portions of the conductor wiring line of the third relay power reception coil 253. The configuration of the third relay power transmission coil 263 is similar to the configuration of the third relay power reception coil 253 and is therefore not described.

Figure 8:
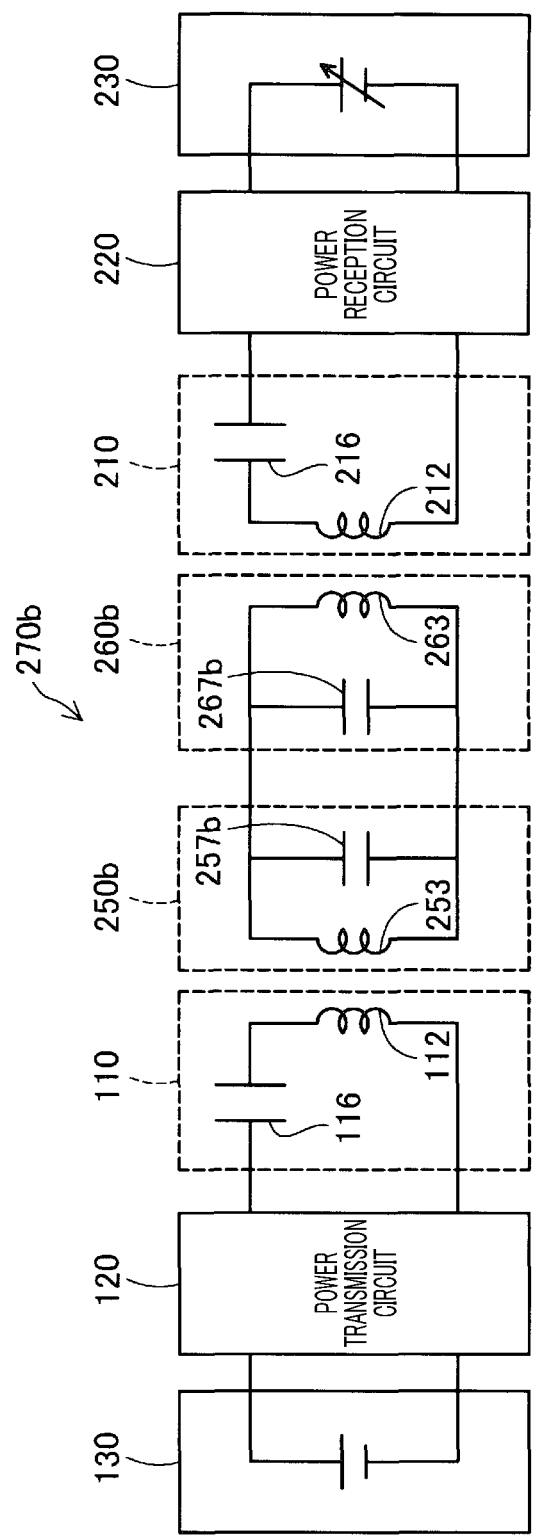
FIG. 8 is a diagram illustrating a circuit configuration of a contactless power supply system according to the second embodiment.

The combined capacitance of stray capacitances in parallel generated in the third relay power reception coil 253 is also called a first stray capacitance 257b, and the combined capacitance of stray capacitances in parallel generated in the third relay power transmission coil 263 is also called a second stray capacitance 267b. The repeater 270b can be represented by a circuit illustrated in FIG. 8.

The relay power reception coil unit 250b has a first self-resonant frequency defined by the third relay power reception coil 253 and the first stray capacitance 257b. The first self-resonant frequency is set to be identical to the first resonant frequency of the power transmission resonant circuit 110 of the power transmitter 100. The third relay power reception coil 253 functions as a resonant coil for magnetic resonance with the power transmission coil 112, and is magnetically coupled with the power transmission coil 112 and thereby receives AC power from the power transmitter 100.

The relay power transmission coil unit 260b has a second self-resonant frequency defined by the third relay power transmission coil 263 and the second stray capacitance 267b. The second self-resonant frequency is set to be identical to the second resonant frequency of the power reception resonant circuit 210 of the power receiver 205. The third relay power transmission coil 263 functions as a resonant coil for magnetic resonance with the power reception coil 212, and is magnetically coupled with the power reception coil 212 and thereby transmits AC power to the power receiver 205.

As described above, the contactless power supply system 300 according to the present embodiment includes short coils including the third relay power reception coil 253 that generates the first stray capacitance 257b connected thereto in parallel, and the third relay power transmission coil 263 that generates the second stray capacitance 267b connected thereto in parallel. Accordingly, the repeater 270b can receive AC power from the power transmitter 100 and transmit the AC power to the power receiver 205, without including a capacitor. The relay power reception and transmission coil units 250b and 260b are electrically connected to each other, enabling them to be disposed at positions with their axial centers not coinciding with each other, for example, disposed separate from each other, and thus enabling an improvement in freedom of the disposition of the repeater 270b.

In the contactless power supply system 300 according to the present embodiment, the dielectric material 256 is disposed between portions of the conductor wiring line of the third relay power reception coil 253 and between portions of the conductor wiring line of the third relay power transmission coil 263. The dielectric material 256 can increase the first and second stray capacitances 257b and 267b that are each connected in parallel. Therefore, for example, the winding number of each of the third relay power reception and transmission coils 253 and 263 can be reduced.

Figure 9:
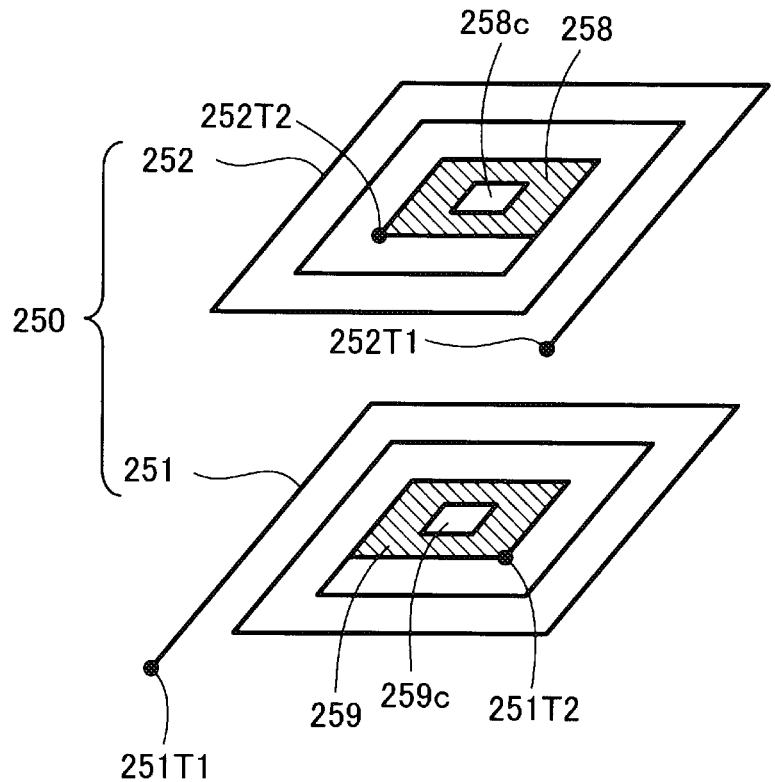
FIG. 9 is a diagram illustrating a configuration of a relay power reception coil unit in another embodiment.

C. Other Embodiments (C1) As illustrated in FIG. 9, the relay power reception coil unit 250 of the first embodiment may further include a first conductive plate 259 in the center of the first relay power reception coil 251, and a second conductive plate 258, which is opposite to the first conductive plate 259, in the center of the second relay power reception coil 252. The contactless power supply system 300 according to this aspect enables the conductor wiring line of the first relay power reception coil 251 and the conductor wiring line of the second relay power reception coil 252 to have a large area opposite each other and thus to increase the first stray capacitance 257 connected in series. The conductive plates 258, 259 may each be formed integrally with the coil in the process of forming the coil, or a tabular conductor that is a component other than the coil may be fitted in the center of the coil. As illustrated in FIG. 9, the first conductive plate 259 includes an opening 259c for allowing a magnetic flux of the first relay power reception coil 251 to pass therethrough at a position to be the axial center of the first relay power reception coil 251, and the second conductive plate 258 includes an opening 258c for allowing a magnetic flux of the second relay power reception coil 252 to pass therethrough at a position to be the axial center of the second relay power reception coil 252. The conductive plates 258, 259 are provided with the openings 258c and 259c, or may each be disposed at a position at which the conductive plate does not inhibit formation of the magnetic flux in the coil.

(C2) The relay power transmission coil unit 260 of the first embodiment may further include a third conductive plate in the center of the first relay power transmission coil 261, and a fourth conductive plate, which is opposite to the third conductive plate, in the center of the second relay power transmission coil 262. The third and fourth conductive plates may have a configuration similar to the configuration of the first and second conductive plates 259 and 258. The contactless power supply system 300 according to this aspect enables the conductor wiring line of the first relay power transmission coil 261 and the conductor wiring line of the second relay power transmission coil 262 to have a large area opposite each other and thus to increase the second stray capacitance 267. The conductive plates may each be formed integrally with the coil in the process of forming the coil, or a tabular conductor that is a component other than the coil may be fitted in the center of the coil. The third and fourth conductive plates are provided with openings, or may each be disposed at a position at which the conductive plate does not inhibit formation of the magnetic flux in the coil.

Figure 10:
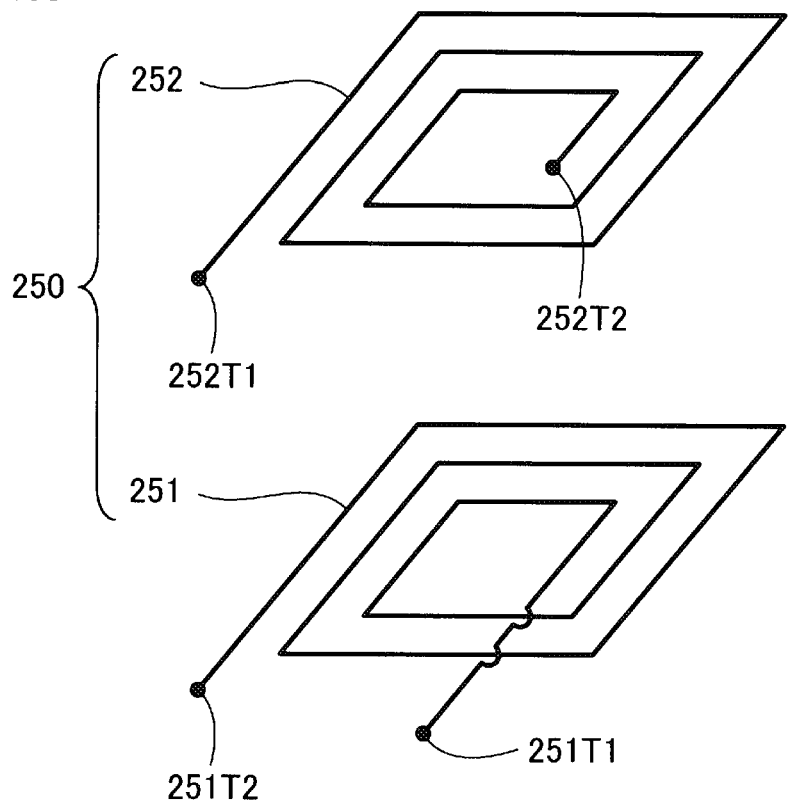
FIG. 10 is a diagram illustrating a configuration of a relay power reception coil unit in another embodiment.

(C3) In the first embodiment, the first and second relay power reception coils 251 and 252 of the relay power reception coil unit 250 are configured by the first combination. Instead of this configuration, as illustrated in FIG. 10, the first and second relay power reception coils 251 and 252 may be configured by a following second combination. More specifically, as illustrated in FIG. 10, the second relay power reception coil 252 is a right-handed coil extending toward the center of the coil from the first end 252T1 that is disposed on the outer periphery side of the coil and electrically connected to the second relay power transmission coil 262. The first relay power reception coil 251 is a right-handed coil extending toward the center of the coil from the second end 251T2 that is disposed on the outer periphery side of the coil and is open. As illustrated in FIG. 10, the first end 251T1 of the first relay power reception coil 251 may be extended from the center to the outer periphery side of the coil. The first relay power reception coil 251 may be a left-handed coil extending from the second end 251T2 toward the center of the coil. The first and second relay power reception coils 251 and 252 may be opposite in configuration. More specifically, the first relay power reception coil 251 may be a right-handed coil extending toward the center of the coil from the first end 251T1 that is disposed on the outer periphery side of the coil and electrically connected to the first relay power transmission coil 261, and the second relay power reception coil 252 may be a right-handed coil extending toward the center of the coil from the second end 252T2 that is disposed on the outer periphery side of the coil and is open.

Figure 11:
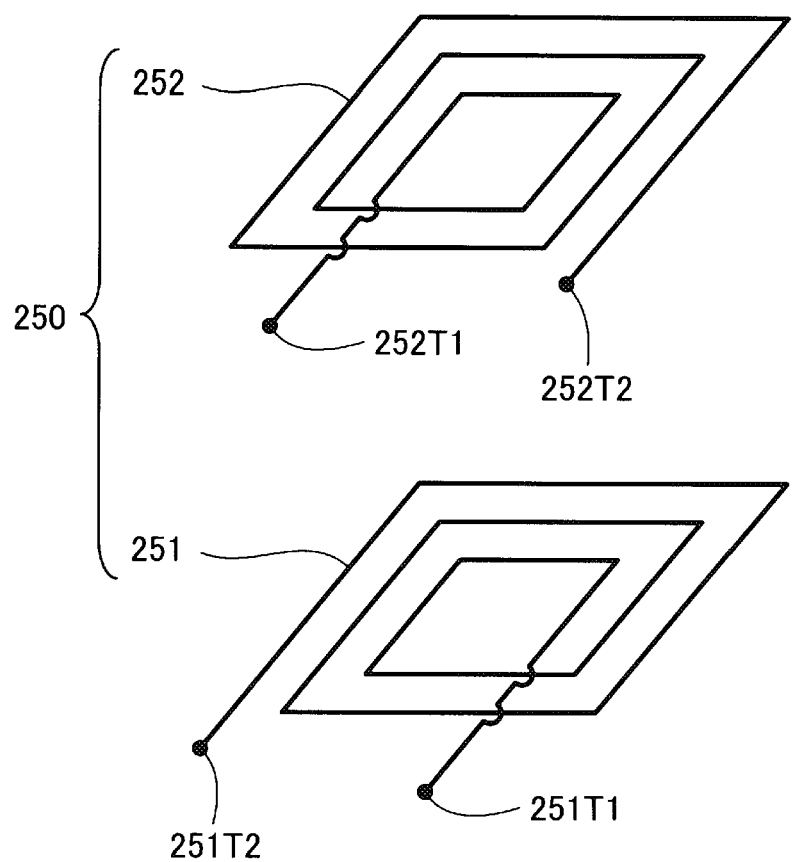
FIG. 11 is a diagram illustrating a configuration of a relay power reception coil unit in another embodiment.

(C4) In the first embodiment, the first and second relay power reception coils 251 and 252 of the relay power reception coil unit 250 are configured by the first combination. Instead of this configuration, as illustrated in FIG. 11, the first and second relay power reception coils 251 and 252 may be configured by a following third combination. More specifically, as illustrated in FIG. 11, the second relay power reception coil 252 is a left-handed coil extending toward the center of the coil from the second end 252T2 that is disposed on the outer periphery side of the coil and is open. As illustrated in FIG. 11, the first end 252T1 of the second relay power reception coil 252 may be extended from the center to the outer periphery side of the coil. The first relay power reception coil 251 is a right-handed coil extending toward the center of the coil from the second end 251T2 that is disposed on the outer periphery side of the coil and is open. As illustrated in FIG. 11, the first end 251T1 of the first relay power reception coil 251 may be extended from the center to the outer periphery side of the coil. The first relay power reception coil 251 may be a left-handed coil extending from the second end 251T2 toward the center of the coil. The first and second relay power reception coils 251 and 252 may be opposite in configuration. More specifically, the first relay power reception coil 251 may be a left-handed coil extending toward the center of the coil from the second end 251T2 that is disposed on the outer periphery side of the coil and is open, and the second relay power reception coil 252 may be a right-handed coil extending toward the center of the coil from the second end 252T2 that is disposed on the outer periphery side of the coil and is open.

(C5) In the first embodiment, the first and second relay power transmission coils 261 and 262 of the relay power transmission coil unit 260 are configured by the fourth combination. Instead of this configuration, the first and second relay power transmission coils 261 and 262 may be configured by a following fifth combination. More specifically, the second relay power transmission coil 262 is a right-handed coil extending toward the center of the coil from the first end 262T1 that is disposed on the outer periphery side of the coil and electrically connected to the second relay power transmission coil 262. The first relay power transmission coil 261 is a right-handed coil extending toward the center of the coil from the second end 261T2 that is disposed on the outer periphery side of the coil and is open. The first end 261T1 of the first relay power transmission coil 261 may be extended from the center to the outer periphery side of the coil. The first relay power transmission coil 261 may be a left-handed coil extending from the second end 261T2 toward the center of the coil. The first and second relay power transmission coils 261 and 262 may be opposite in configuration. More specifically, the first relay power transmission coil 261 may be a right-handed coil extending toward the center of the coil from the first end 261T1 that is disposed on the outer periphery side of the coil and electrically connected to the first relay power reception coil 251, and the second relay power transmission coil 262 may be a right-handed coil extending toward the center of the coil from the second end 262T2 that is disposed on the outer periphery side of the coil and is open.

(C6) In the first embodiment, the first and second relay power transmission coils 261 and 262 of the relay power transmission coil unit 260 are configured by the fourth combination. Instead of this configuration, the first and second relay power transmission coils 261 and 262 may be configured by a following sixth combination. More specifically, the second relay power transmission coil 262 is a left-handed coil extending toward the center of the coil from the second end 262T2 that is disposed on the outer periphery side of the coil and is open. The first end 262T1 of the second relay power transmission coil 262 may be extended from the center to the outer periphery side of the coil. The first relay power transmission coil 261 is a right-handed coil extending toward the center of the coil from the second end that is disposed on the outer periphery side of the coil and is open. The first end 261T1 of the first relay power transmission coil 261 may be extended from the center to the outer periphery side of the coil. The first relay power transmission coil 261 may be a left-handed coil extending from the second end 261T2 toward the center of the coil. The first and second relay power transmission coils 261 and 262 may be opposite in configuration. More specifically, the first relay power transmission coil 261 may be a left-handed coil extending toward the center of the coil from the second end 261T2 that is disposed on the outer periphery side of the coil and is open, and the second relay power transmission coil 262 may be a right-handed coil extending toward the center of the coil from the second end 262T2 that is disposed on the outer periphery side of the coil and is open.

(C7) In the embodiments described above, the relay power reception coil unit 250, 250b is disposed in a lower part of the vehicle 200, but may be disposed at any position in the vehicle 200, such as a tire or a wheel of the vehicle 200, which enables the relay power reception coil unit to be magnetically coupled with the power transmission resonant circuit 110. The relay power transmission coil unit 260, 260b may be disposed at any position in the vehicle 200, which enables the relay power transmission coil unit to be magnetically coupled with the power reception resonant circuit 210. Both the relay power reception and transmission coil units may be disposed on the road RS.

(C8) In the first embodiment, as an example are described the first and second relay power reception coils 251 and 252 that each consist of a conductor wiring line having the width W1 in the vertical section thereof, and as an example are described the first and second relay power transmission coils 261 and 262 that each consist of a conductor wiring line having the width W2. Instead of these examples, at least any one of the first and second relay power reception coils 251 and 252 and the first and second relay power transmission coils 261 and 262 may consist of a conductor wiring line having a width set to be different between on the outer periphery side and on the center side of the coil, such as making the width on the center side larger than on the outer periphery side of the coil, so as to increase the stray capacitance in series. The contactless power supply system 300 according to this aspect can increase the stray capacitance connected in series without a change in the outer-surface area of the coil.

(C9) In the first embodiment, as an example is described the first relay power reception coil 251 that consists of a conductor wiring line having the width W1 which is larger than the thickness T1 in the vertical section thereof and having the distance L1 between portions of the conductor wiring line which is larger than the distance G1 between the first and second relay power reception coils 251 and 252. Instead of this example, the first relay power reception coil 251 may consist of a conductor wiring line having the width W1 which is smaller than the thickness T1 in the vertical section thereof and having the distance L1 between portions of the conductor wiring line which is smaller than the distance G1 between the first and second relay power reception coils 251 and 252.

(C10) In the first embodiment, as an example is described the first relay power transmission coil 261 that consists of a conductor wiring line having the width W2 which is larger than the thickness T2 and having the distance L2 between portions of the conductor wiring line which is larger than the distance G2 between the first and second relay power transmission coils 261 and 262. Instead of this example, the first relay power transmission coil 261 may consist of a conductor wiring line having the width W2 which is smaller than the thickness T2 and having the distance L2 between portions of the conductor wiring line which is smaller than the distance G2 between the first and second relay power transmission coils 261 and 262.

(C11) In the first embodiment, the dielectric material 256 is disposed between the first and second relay power reception coils 251 and 252 and between the first and second relay power transmission coils 261 and 262, but does not necessarily have to be provided.

(C12) In the second embodiment, the dielectric material 256 is disposed between portions of the conductor wiring line of the third relay power reception coil 253, but does not necessarily have to be provided.

(C13) In the first embodiment, an example is described in which one type of dielectric material 256 is disposed between the first and second relay power reception coils 251 and 252 and between the first and second relay power transmission coils 261 and 262. Instead of this example, a plurality of dielectric materials having different relative permittivities may be disposed at least one of between the first and second relay power reception coils 251 and 252 or between the first and second relay power transmission coils 261 and 262, for example, by disposing, on the center side of the coil, a dielectric material having a high relative permittivity and disposing, on the outer periphery side of the coil, a dielectric material having a low relative permittivity, so as to increase the stray capacitance in series. The contactless power supply system 300 according to this aspect can increase the stray capacitance connected in series.

(C14) In the first to sixth combinations, the first end 251T1 of the first relay power reception coil 251 may be electrically connected to the first end 262T1 of the second relay power transmission coil 262, and the first end 252T1 of the second relay power reception coil 252 may be electrically connected to the first end 261T1 of the first relay power transmission coil 261.

The present disclosure is not limited to the embodiments described above and can be realized with various configurations, without departing from the spirit of the present disclosure. For example, the technical features in the embodiments corresponding to the technical features described in the section of Summary of the Invention can appropriately be replaced or combined with each other to solve a part or all of the problems described above or to achieve a part or all of the effects described above. In addition, the technical features can appropriately be deleted unless they are described as essential in the present specification.

What is claimed is:

1. A contactless power supply system for vehicles, the contactless power supply system comprising:
  a power transmitter including a first capacitor and a power transmission coil that transmits AC power, and having a first resonant frequency defined by the power transmission coil and the first capacitor;
  a power receiver including a second capacitor and a power reception coil that receives AC power, and having a second resonant frequency defined by the power reception coil and the second capacitor; and
  a repeater that:
    transmits, to the power reception coil, AC power received from the power transmission coil, and includes:

a relay power reception coil unit configured to receive the AC power transmitted from the power transmission coil and including at least one coil that defines a first stray capacitance for forming a first self-resonant frequency having a frequency identical to the first resonant frequency; and a relay power transmission coil unit configured to transmit the AC power to the power receiver and including at least one coil that defines a second stray capacitance for forming a second self-resonant frequency having a frequency identical to the second resonant frequency, the at least one coil of the relay power reception coil unit being directly electrically connected to the at least one coil of the relay power transmission coil unit.

2. The contactless power supply system according to claim 1, wherein the relay power reception coil unit includes, as two coils, a first relay power reception coil, and a second relay power reception coil disposed opposite and close to the first relay power reception coil on a power-receiver side with respect to the first relay power reception coil and configured to generate the first stray capacitance which is connected in series, the relay power transmission coil unit includes, as two coils, a first relay power transmission coil, and a second relay power transmission coil disposed opposite and close to the first relay power transmission coil on a power-transmitter side with respect to the first relay power transmission coil and configured to generate the second stray capacitance which is connected in series, a first end of the first relay power reception coil is electrically connected to a first end of the first relay power transmission coil, and a second end of the first relay power reception coil and a second end of the first relay power transmission coil are open, a first end of the second relay power reception coil is electrically connected to a first end of the second relay power transmission coil, and a second end of the second relay power reception coil and a second end of the second relay power transmission coil are open, the first self-resonant frequency includes a series resonant frequency that is set to coincide with a frequency of the AC power transmitted from the power transmission coil and is smaller than a parallel resonant frequency of the first self-resonant frequency, and the second self-resonant frequency includes a series resonant frequency that is set to coincide with a frequency of the AC power received by the power reception coil and is smaller than a parallel resonant frequency of the second self-resonant frequency.

3. The contactless power supply system according to claim 2, wherein the relay power reception coil unit includes at least any one of following combinations of the first and second relay power reception coils:

a first combination in which a first one of the coils is a right-handed planar coil extending from a first end that is disposed on an outer periphery side of the coil and connected electrically, and a second one of the coils is a planar coil including a first end that is connected electrically and disposed on an outer periphery side of the coil;

a second combination in which a first one of the coils is a right-handed planar coil extending from a first end that is disposed on an outer periphery side of the coil and connected electrically, and a second one of the coils is a planar coil including a second end that is open and disposed on an outer periphery side of the coil; and a third combination in which a first one of the coils is a left-handed planar coil extending from a second end that is disposed on an outer periphery side of the coil and is open, and a second one of the coils is a planar coil including a second end that is open and disposed on an outer periphery side of the coil.

4. The contactless power supply system according to claim 2, wherein the relay power transmission coil unit includes at least any one of following combinations of the first and second relay power transmission coils:

a fourth combination in which a first one of the coils is a right-handed planar coil extending from a first end that is disposed on an outer periphery side of the coil and connected electrically, and a second one of the coils is a planar coil including a first end that is connected electrically and disposed on an outer periphery side of the coil;

a fifth combination in which a first one of the coils is a right-handed planar coil extending from a first end that is disposed on an outer periphery side of the coil and connected electrically, and a second one of the coils is a planar coil including a second end that is open and disposed on an outer periphery side of the coil; and a sixth combination in which a first one of the coils is a left-handed planar coil extending from a second end that is disposed on an outer periphery side of the coil and is open, and a second one of the coils is a planar coil including a second end that is open and disposed on an outer periphery side of the coil.

5. The contactless power supply system according to claim 2, wherein the relay power reception coil unit includes:

a first conductive plate in a center of the first relay power reception coil; and a second conductive plate which is opposite to the first conductive plate, in a center of the second relay power reception coil.

6. The contactless power supply system according to claim 2, wherein the relay power transmission coil unit includes:

a third conductive plate in a center of the first relay power transmission coil; and a fourth conductive plate which is opposite to the third conductive plate, in a center of the second relay power transmission coil.

7. The contactless power supply system according to claim 2, wherein a coil included in at least one of the relay power reception and transmission coil units is different in line width between on an outer periphery side and on a center side of the coil.

8. The contactless power supply system according to claim 2, wherein the first and second relay power reception coils of the relay power reception coil unit each have:

a distance (L1) between portions of a conductor constituting the coil which is larger than a shortest distance (G1) between the first and second relay power reception coils; and a width (W1) which is larger than a thickness (T1) in a section of the conductor.

9. The contactless power supply system according to claim 2, wherein the first and second relay power transmission coils of the relay power transmission coil unit each have:

a distance (L2) between portions of a conductor constituting the coil which is larger than a shortest distance (G2) between the first and second relay power transmission coils; and a width (W2) which is larger than a thickness (T2) in a section of the conductor.

10. The contactless power supply system according to claim 2, wherein a dielectric material is disposed at least one of between the first and second relay power reception coils of the relay power reception coil unit or between the first and second relay power transmission coils of the relay power transmission coil unit.

11. The contactless power supply system according to claim 10, wherein the dielectric material includes a plurality of dielectric materials having different relative permittivities.

12. The contactless power supply system according to claim 1, wherein the relay power reception coil unit includes a third relay power reception coil that generates the first stray capacitance which is connected in parallel, the relay power transmission coil unit includes a third relay power transmission coil that generates the second stray capacitance which is connected in parallel, a first end of the third relay power reception coil is electrically connected to a first end of the third relay power transmission coil, and a second end of the third relay power reception coil is electrically connected to a second end of the third relay power transmission coil, the first self-resonant frequency includes a parallel resonant frequency that is set to coincide with a frequency of the AC power transmitted from the power transmission coil, and the second self-resonant frequency includes a parallel resonant frequency that is set to coincide with a frequency of the AC power received by the power reception coil.

13. The contactless power supply system according to claim 12, wherein a dielectric material is disposed between portions of a line of at least one of the third relay power reception coil of the relay power reception coil unit or the third relay power transmission coil of the relay power transmission coil unit.

14. The contactless power supply system according to claim 1, wherein the power receiver and the repeater, including the relay power reception coil unit and the relay power transmission coil unit, are located on a vehicle, and the power transmitter is not located on the vehicle.

* * * * *